M. A. POSSONS.

GAS RANGE.

APPLICATION FILED DEC. 24, 1915.

Reissued Feb. 15, 1916.

14,068.

2 SHEETS—SHEET 1.

Witness

L. L. Burket.

E. J. Child

Inventor

Minard A. Possons

By A. S. Patterson

Attorney

M. A. POSSONS.

GAS RANGE.

APPLICATION FILED DEC. 24, 1915.

Reissued Feb. 15, 1916.

14,068.

2 SHEETS—SHEET 2.

Witness

L. L. Burket

C. J. Child

Inventor

Minard A. Possons,

By

A. S. Pattison,

Attorney

UNITED STATES PATENT OFFICE.

MINARD A. POSSONS, OF CLEVELAND, OHIO, ASSIGNOR TO AMERICAN STOVE COMPANY, OF ST. LOUIS, MISSOURI, A CORPORATION OF NEW JERSEY.

GAS-RANGE.

14,068. Specification of Reissued Letters Patent. Reissued Feb. 15, 1916.

Original No. 1,160,755, dated November 16, 1915, Serial No. 878,722. Application for reissue filed December 24, 1915. Serial No. 68,577.

*To all whom it may concern:*

Be it known that I, MINARD A. POSSONS, a citizen of the United States, residing at Cleveland, in the county of Cuyahoga and State of Ohio, have invented certain new and useful Improvements in Gas-Ranges, of which the following is a specification, reference being had therein to the accompanying drawing.

My invention relates to improvements in gas ranges.

The object of my invention is to provide a gas range in which a broiler burner is arranged in the upper portion of the oven and whereby a damper is so arranged that it is open when the gas supply to the broiler burner is open and closed when the gas supply to the broiler burner is closed. This is essential owing to the fact that in broiling it is necessary to have some escape for the smoke, and it is also necessary to close up the oven when baking, which result follows from the structure herein later described.

Another object of my invention is to provide a simple and effective arrangement having certain details of structure and combination of parts hereinafter fully described.

Figure 1:
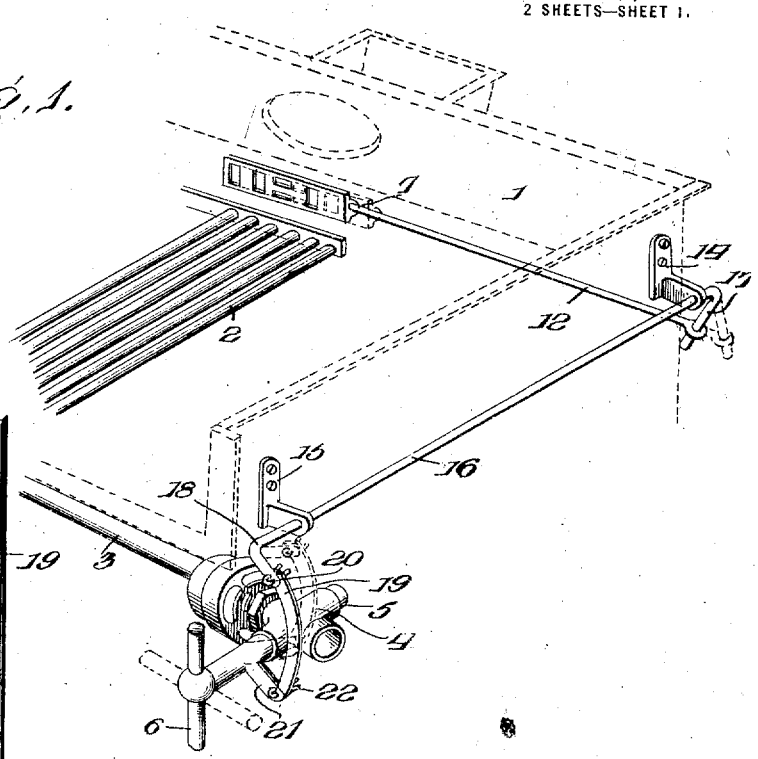
Figure 2:
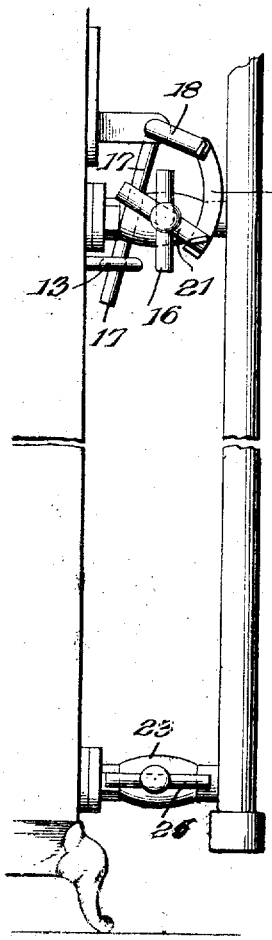
Figure 5:
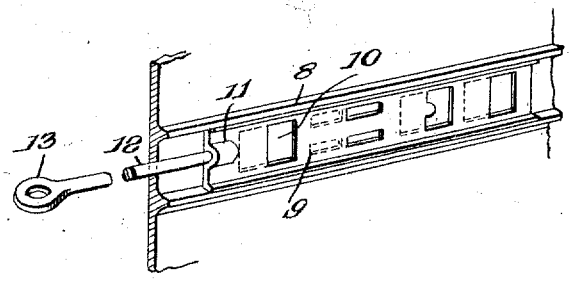
Figure 3:
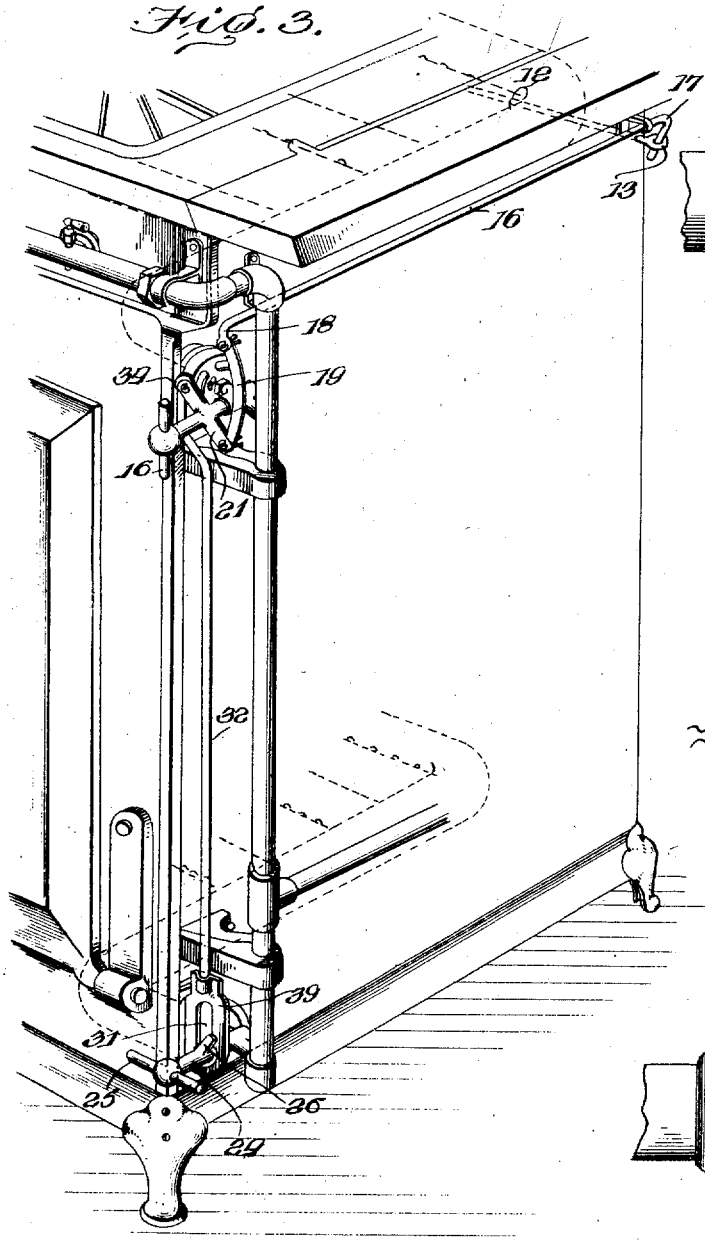
Figure 4:
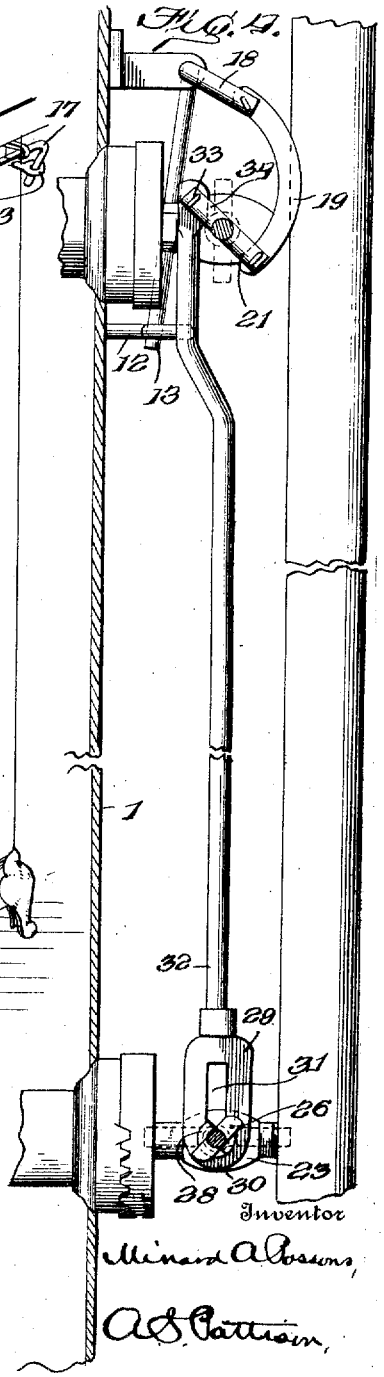

In the accompanying drawings, Figure 1 is a perspective view, in dotted lines, of the upper end of an oven showing my improvement applied thereto. Fig. 2 is a side elevation, partly broken away, showing the arrangement of the gas valve for the broiler burner and the gas valve for the baking burner. Fig. 3 is a perspective view of a gas oven similar to that shown in Fig. 1, but showing the lock between the gas valve for the broiler burner and the gas valve for the baking burner, whereby but one burner can be used at a time. Fig. 4 is an enlarged side elevation of Fig. 1, showing the oven in section. Fig. 5 is a perspective view of my improved damper.

Referring now to the drawings, 1 represents the oven which has arranged adjacent its upper end the broiler burner 2, which is supplied with gas through the pipe 3 leading from the valve 4. This valve 4 is of the turning-plug type having the plug 5 provided with a handle 6 at its outer end and by means of which the gas is turned on and off to the broiler burner 2. The oven 1, to the rear just above the broiler burner 2, is provided with an opening 7, provided with a guide-way 8 on which is slidably mounted the damper 9. This damper is of metal having a series of openings 10, adapted to register with corresponding openings in the oven, whereby the proper ventilation for the escape of the smoke for the upper end of the oven is provided. Secured to the enlarged portion 11 of the damper 9 is a rod 12, which extends outwardly and is provided with an eye 13, at its outer end on the outside of the oven. The side of the oven adjacent the said rod is provided with brackets 14 and 15, in which is mounted the oscillating rod 16, which has at its outer end the bracket 14 and downwardly turned portion 17. This portion 17 enters the eye 13 and by oscillating the rod 16, the rod 12 is oscillated for opening and closing the damper 9.

The end of the rod 16 on the outside of the bracket 15 is provided with a downwardly turned portion 18, which is connected to the curved arm 19 by means of a cotter-pin 20. The turning plug 5 of the valve 4 is provided with a rigidly extending arm 21, to which the lower end of the link 19 is connected by the cotter-pin 22. By this arrangement it will be seen that the turning of the plug 5 to the left by means of the handle 6 to open the valve allows the gas to pass through the pipe 3 to the broiler burner, throws the arm 21 upwardly and through the medium of the link 19, the rod 16 is rocked. This rocking of the rod 16 through the medium of the rod 12 causes the damper 9 to move in a position so that the openings 10 register with the openings in the rear wall of the oven, whereby the smoke and the like may pass from the oven. In stoves of this character, it is essential in carrying out my present invention that the damper be closed when the baking burner is in operation. In ovens of this character, it is also very desirable that the broiler burner be out of operation when the baking burner is in operation, and vice versa, for the reason that if gas is inadvertently turned into the oven through one burner while the other burner is lighted an explosion will occur within the oven if it is closed; or if gas should be inadvertently turned into the oven through an unlighted burner and then the other burner turned on and lighted and the oven closed, there would be an explosion therein, and if the oven door is open under the last-mentioned condition, a flame will issue from the door opening which is dangerous to any one standing by. In order to prevent the two burners from being turned on at the same time, I have provided the structure shown in Figs. 3 and 4.

The valve 23 for supplying the gas to the baking burner has its turning plug 24 extended outwardly and provided with a handle 25 by means of which the plug is turned. The said turning plug is provided with outwardly extending guide ears 26 and 27, and on the inside of these ears, is provided with an enlarged portion 28. Surrounding this enlarged portion is an elongated plate member 29, having a circular opening 30 within which turns the member 28. Extending upwardly within the plate 29 is an elongated slot 31, which communicates with the circular opening 30. Connected to the upper end of the plate 29 is a rod 32, which has its upper end connected by a cotter pin 33 to a rigid arm 34, carried by the turning plug 5 of the broiler burner.

When the turning plug 24 of the baking burner is turned in a position to supply gas to the said baking burner, the enlarged portion 28 carried thereby is in a position transverse the enlarged circular openings 30, and locks the rod 32 against movement. Thus it will be seen that the turning plug 5 of the broiler burner can not be operated and thus gas can not be supplied to the broiler burner when the valve of the baking burner is open. When the valve of the baking burner is turned, the enlarged portion 28 carried by the turning plug 24 registers with the elongated slot 31 and thus the turning plug 5 can be turned as the plate 29 travels downwardly around the member.

Having thus described my invention what I claim and desire to secure by Letters Patent is:

1. The combination with an oven having a baking burner, a gas supply valve for said burner, a broiler burner in the oven, a gas supply valve for the broiler burner, a damper in the oven, and means operated by the gas supply valve of the broiler burner for opening the damper when the valve is open and closing the damper before the valve for the baking burner is opened.

2. The combination with an oven, of a baking burner in the lower end of the oven, a broiler burner in the upper end of the oven, gas supply valves for said burners, a damper for the oven, and means operated by the gas supply valve of the broiler burner for opening the damper when the valve is open and closing the damper before the valve of the baking burner is opened.

3. The combination with a gas oven having a baking burner in its lower end, a gas supply valve for said burner, a broiler burner in the upper end of the oven, a gas supply valve for the broiler burner, a damper for the oven, and means connecting the gas supply valve of the broiler burner and the damper, whereby the damper is opened when the broiler burner valve is open and closed before the valve of the baking burner is opened.

4. The combination with a gas range having a baking burner in its lower end, a gas supply valve for said burner, a broiler burner in the upper end of the oven, a gas supply valve for the broiler burner, a damper for the oven, means operated by the movement of the gas supply valve of the broiler burner for opening the damper when the valve is opened and closing the damper when the valve is closed, and means connecting the two valves whereby but one valve is allowed to be opened at the same time.

5. The combination with a gas range having a baking burner in its lower end, a gas supply valve for said burner, a broiler burner in the upper end of the oven, a gas supply valve for the broiler burner, a damper for the oven, means connecting the gas supply valve of the broiler burner with the damper for opening the damper with the opening of the valve and closing the damper with the closing of the valve, and a rod connecting the gas supply valve of the broiler burner with the gas supply valve of the baking burner, whereby both valves cannot be opened at the same time.

6. The combination with a gas range having a lower baking burner, a gas supply valve for the said burner, a broiler burner in the upper end of the oven, a gas supply valve for the broiler burner, a damper for the oven, means connecting the gas supply valve of the broiler burner with the damper for opening the damper with the opening of the valve and closing the damper with the closing of the valve, and a rod pivotally connected to the valve stem of one valve and having a keyhole slot connection with the valve stem of the other valve, whereby both valves can not be opened at the same time.

7. The combination with a gas range having a lower baking burner, a valve for said burner, a broiler burner within the upper end of the oven, a gas supply for the said burner, a damper for the oven, means connecting the gas supply valve of the broiler burner with the damper for opening the damper when the valve is opened and closing the damper when the valve is closed, a projection carried by the valve stem of one valve, a rod pivotally connected to the said projection, the valve stem of the other valve having a transverse member carried thereby and working in a keyhole slot in the lower end of the rod, whereby both valves can not be opened at the same time.

8. The combination with a gas range having a baking burner, a gas supply valve for the said burner, a broiler burner in the upper end of the oven, a gas supply valve for the said burner, a damper for the oven, means connecting the damper and the valve for the broiler burner, whereby the damper is opened with the opening of the valve and closed with the closing of the valve, an arm carried by the valve stem of one valve, a rod pivotally connected to the said arm, a transverse member carried by the valve stem of the other valve and lower end of the rod having an elongated portion provided with a keyhole slot and adapted to receive the transverse member carried by the valve stem, whereby both valves cannot be opened at the same time.

9. The combination with a combined baking and broiling oven having a baker burner and a broiler burner, gas valves for the two burners, a smoke outlet for the oven, and means controlled by one of said valves for opening the smoke outlet when the broiler burner is operating and the baker burner is not operating and closing said outlet when the baker burner is operating and the broiler burner not operating, the parts combined for the purpose described.

10. The combination with a combined baking and broiling oven having a baker burner and a broiler burner, gas valves for the two burners, a smoke outlet for the oven, a damper for the outlet, and an operative connection between one of said valves and the damper which opens the damper when the broiler burner gas valve is open and the baker burner gas valve is closed, and closes the damper when the broiler burner valve is closed and the baker burner valve is open, the parts combined for the purpose described.

11. The combination with a combined baking and broiling oven having baking and broiling burners, and also having a smoke outlet, of a controlling member for said outlet, and means operating said controlling member to open it when the broiler burner is operating and the baker burner not operating, and to close said member when the baker burner is operating and the broiler burner is not operating, the parts combined for the purpose described.

12. The combination with a combined baking and broiling oven having a baker burner at its bottom and a broiler burner at its upper portion, and also having a smoke outlet, of a damper for said outlet, fuel supply for said burners, fuel control for the burners, and an operating member connected with the damper and fuel control to open the damper when the broiler burner is operating and the baker burner not operating and to close the damper when the baker burner is operating and the broiler burner is not operating, the parts combined for the purpose described.

13. The combination with a combined broiling and baking oven, of a baker burner in the bottom and a broiler burner in the top of the oven, a smoke outlet in the top of the oven, a damper controlling the outlet, fuel controls for said burners, and an operative connection between the fuel controls and said damper and opening the damper when fuel is fed to the broiler burner and fuel cut off from the baker burner and the damper closed when fuel is fed to the baker burner and fuel cut off from the broiler burner, the parts combined for the purpose described.

14. The combination with a combined baking and broiling oven, of a baking and a broiling burner, fuel controls for said burners, locking means between said fuel controls to prevent the opening of both fuel controls at the same time, the oven having a smoke outlet, a controlling member for the outlet, and operating means between the controlling member and the fuel controls opening the outlet when the broiler burner is operating and the baker burner not operating and closing the outlet when the baker burner is operating and the broiler burner not operating, the parts combined for the purpose described.

In testimony whereof I hereunto affix my signature in the presence of two witnesses.

MINARD A. POSSONS.

Witnesses:
L. M. Kelly,
F. T. Batchelor.